(12) United States Patent
Xu et al.

(10) Patent No.: US 10,384,393 B2
(45) Date of Patent: Aug. 20, 2019

(54) POLYMERIC CERAMIC PRECURSORS, APPARATUSES, SYSTEMS, AND METHODS

(71) Applicant: Florida State University Research Foundation, Inc., Tallahassee, FL (US)

(72) Inventors: Chengying Xu, Tallahassee, FL (US); Amanda Schrand, Eglin AFB, FL (US)

(73) Assignee: Florida State University Research Foundation, Inc., Tallahassee, FL (US)

(*) Notice: Subject to any disclaimer, the term of this patent is extended or adjusted under 35 U.S.C. 154(b) by 144 days.

(21) Appl. No.: 15/607,456

(22) Filed: May 27, 2017

(65) Prior Publication Data

US 2017/0341297 A1 Nov. 30, 2017

Related U.S. Application Data

(60) Provisional application No. 62/342,429, filed on May 27, 2016.

(51) Int. Cl.
| | |
|---|---|
| *B28B 1/00* | (2006.01) |
| *C04B 35/589* | (2006.01) |
| *B29C 35/08* | (2006.01) |
| *B29C 64/112* | (2017.01) |
| *B29C 64/188* | (2017.01) |
| *B33Y 10/00* | (2015.01) |
| *B33Y 30/00* | (2015.01) |

(52) U.S. Cl.
CPC ............ *B29C 64/112* (2017.08); *B28B 1/001* (2013.01); *B29C 64/188* (2017.08); *C04B 35/589* (2013.01); *B29C 2035/0827* (2013.01); *B33Y 10/00* (2014.12); *B33Y 30/00* (2014.12); *C04B 2235/483* (2013.01); *C04B 2235/5288* (2013.01); *C04B 2235/6021* (2013.01)

(58) Field of Classification Search
CPC ..... B28B 1/001; B29C 64/112; C04B 35/589; C04B 2235/483
See application file for complete search history.

(56) References Cited

U.S. PATENT DOCUMENTS

| | | | |
|---|---|---|---|
| 2017/0008236 A1* | 1/2017 | Easter | ................... B29C 64/153 |
| 2018/0148585 A1* | 5/2018 | Eckel | ..................... B33Y 70/00 |
| 2018/0298215 A1* | 10/2018 | Andersen | .............. C04B 28/006 |

OTHER PUBLICATIONS

Huang, T. et al., "Aqueous-based freeze-form extrusion fabrication of alumina components," Rapid Prototyping Journal, vol. 15, No. 2, pp. 88-95, 2009.
Leu, M.C. et al. "Development of Freeze-Form Extrusion Fabrication with Use of Sacrificial Material," Journal of Manufacturing Science and Engineering, vol. 36, p. 061014 (1-9), 2014.
(Continued)

*Primary Examiner* — Erin Snelting
(74) *Attorney, Agent, or Firm* — Eversheds Sutherland (US) LLP (57) ABSTRACT

Provided herein are methods of manufacturing a ceramic article. The methods may include providing a liquid-state pre-ceramic polymer component, disposing the liquid-state pre-ceramic polymer component on a support, curing the liquid-state pre-ceramic polymer component, and subjecting the pre-ceramic polymer to pyrolysis. Apparatuses and systems for manufacturing a ceramic article also are provided.

18 Claims, 2 Drawing Sheets

(56) References Cited

OTHER PUBLICATIONS

Li, M. et al. "Modeling, Analysis and Simulation of Paste Freezing in Freeze-Form Extrusion Fabrication of Thin-Wall Parts," Journal of Manufacturing Science and Engineering, vol. 136, p. 061003 (1-11), 2014.

Liu, H. et al. "Factors Influencing Paste Extrusion Pressure and Liquid Content of Extrudate in Freeze-Form Extrusion Fabrication," International Journal of Advanced Manufacturing Technology, vol. 67, p. 899-906, 2013.

Etienne, E. et al. "CNT Reinforced Ceramics 3D Printer—Midterm I Presentation," 2015.

Etienne, E. et al. "CNT Reinforced Ceramics 3D Printer—Midterm II Presentation," 2015.

Etienne, E. et al. "CNT Reinforced Ceramics 3D Printer—Final Presentation," 2015.

Etienee, E. et al. "Final Report—CNT Reinforced Ceramics 3D Printer," Apr. 10, 2015.

\* cited by examiner

POLYMERIC CERAMIC PRECURSORS, APPARATUSES, SYSTEMS, AND METHODS

CROSS-REFERENCE TO RELATED APPLICATIONS

This application claims priority to U.S. Provisional Patent Application No. 62/342,429, filed May 27, 2016, which is incorporated herein by reference.

STATEMENT REGARDING FEDERALLY SPONSORED RESEARCH OR DEVELOPMENT

This invention was made with Government support from the U.S. Air Force. The Government of the United States has the right to practice or have practiced on behalf of the United States this subject invention throughout the world.

BACKGROUND

Ceramic materials are widely used in many civil and military applications, including structural and functional applications. High temperature resistance and desirable mechanical properties are among the advantages of ceramic materials, while poor toughness and certain processing conditions required for their preparation may be among the disadvantages of ceramic materials. Nevertheless, for certain specific applications, such as fairings in missiles and airplanes, rocket nozzles, and some brake pads, ceramic materials may be preferred over other materials.

Bulk ceramic materials are typically fabricated by compacting and sintering ceramic powders. This process may require high quality ceramic powders (e.g., powders having dimensional and/or compositional uniformity), and/or certain treatment conditions (e.g., a cold isostatic press for the preform, and/or a high temperature hot press furnace for sintering), in order to obtain a final product having high integrity. Products with complex shapes also can be much more difficult to achieve.

Three-dimensional (3D) printing technologies have been developed for a wide variety of materials. Initially, the 3D technologies were capable of utilizing thermoplastics, but improvements in the technology have permitted the use of metals and earthenware. Recently, there have been experiments on food-, wood-, and bio-printing, indicating that the portfolio of materials that may be amenable to 3D printing is expanding.

3D printing generally is a favorable method of additive manufacturing, which may be an advantageous method of manufacturing when conservation of materials, time, and/or energy may be important. By extruding a material in thin lines and stacking each line layer by layer into a desired form, countless articles may be printed into a desired shape and/or geometry. 3D printing technology, therefore, has the potential to simplify highly specialized manufacturing methods in fields such as biomedical engineering, defense, and aerospace, at least because it typically utilizes only the material required for each product, and can eliminate or reduce the need for machining and other tedious secondary handling.

Attempts at 3D printing with ceramics have included dispersing ceramic powders into a polymeric binder to form a slurry. The polymeric binder typically is then removed in a sintering process (see, e.g., T. Huang, et al., Rapid Prototyping Journal, Vol. 15, No. 2, pp. 88-95, 2009; and M. C. Leu et al., Journal of Manufacturing Science and Engineering, Vol. 136, pp 061014 (1-9), 2014). A high-power mixer, however, usually is needed to disperse the ceramic powders sufficiently in the polymeric binder. Also, the sintering process, which usually occurs in a high temperature pressurized furnace, typically imparts open spaces in the manufactured article after the binder is removed. The open spaces may decrease the density of the article, adversely impact the characteristics of the article, or a combination thereof.

There remains a need for methods of additive manufacturing that are capable of taking advantage of one or more of the beneficial properties of ceramics without suffering at least one of the foregoing disadvantages, such as the difficulty of mixing ceramic powders sufficiently in a polymeric binder, the creation of porous and/or cracked articles, or a combination thereof.

BRIEF SUMMARY

Provided herein are polymeric ceramic precursors and methods that may be used to create ceramic articles while avoiding [1] the difficulty of mixing ceramic powders and polymeric binders due to the fact that no binder is required, [2] the creation of porous and/or cracked articles, or [3] a combination thereof. The polymeric ceramic precursors and methods provided herein also may be used to create ceramic articles having desirable mechanical, thermal, and/or electrical properties.

In one aspect, methods of manufacturing a ceramic article are provided. In embodiments, the methods include providing a liquid-state pre-ceramic polymer component; disposing the liquid-state pre-ceramic polymer component on a support; curing the liquid-state pre-ceramic polymer component to form a solid-state pre-ceramic polymer component; and subjecting the solid-state pre-ceramic polymer component to pyrolysis at a temperature and time effective to form the ceramic article. In other embodiments, the methods include providing a liquid-state pre-ceramic polymer component; disposing a first portion of the liquid-state pre-ceramic polymer component on a support that is at a temperature (i) equal to, (ii) less than, or (iii) about 0.1% to about 5% greater than the freezing point of the liquid-state pre-ceramic polymer component; exposing the first portion of the liquid-state pre-ceramic polymer component to ultraviolet light effective to substantially cure the first portion of the liquid-state pre-ceramic polymer component to form a first solid-state pre-ceramic polymer component; disposing a second portion of the liquid-state pre-ceramic polymer component at least partially on the first solid-state pre-ceramic polymer component; exposing the second portion of the liquid-state pre-ceramic polymer component to ultraviolet light effective to substantially cure the second portion of the liquid-state pre-ceramic polymer component to form a second solid-state pre-ceramic polymer component; and subjecting the first and second solid-state pre-ceramic polymer components to pyrolysis at a temperature and time effective to form the ceramic article. The disposing of the liquid-state pre-ceramic polymer component, or a portion thereof, on the support and/or a solid-state pre-ceramic polymer component may include 3D printing the liquid-state pre-ceramic polymer component, or the portion thereof, on the support and/or the solid-state pre-ceramic polymer component. The liquid-state pre-ceramic polymer component may be substantially free of an organic binder. The liquid-state pre-ceramic polymer component also may include one or more additives.

In another aspect, apparatuses for manufacturing a ceramic article are provided. In embodiments, the apparatuses include a syringe pump having a reservoir configured to house a liquid-state pre-ceramic polymer component, a stepper motor, one or more gears, and a push rod; wherein the stepper motor is coupled to the one or more gears, and the one or more gears is configured to apply a force to the push rod to evacuate the liquid-state pre-ceramic polymer component housed in the reservoir. The syringe pump may also include a needle through which the liquid-state pre-ceramic polymer component is evacuated.

In a further aspect, systems for additive manufacturing of a ceramic article are provided. In embodiments, the systems include a 3D printer having a gantry system and a computer controller; and a syringe pump mounted to the gantry system. The syringe pump may include a reservoir configured to house a liquid-state pre-ceramic polymer component, a stepper motor, one or more gears, and a push rod.

DETAILED DESCRIPTION

Provided herein are methods, systems, and apparatuses for making a ceramic article that overcome one or more of the above-described disadvantages. The methods provided herein, in one embodiment, rely on a liquid-state pre-ceramic polymer component that is substantially free of an organic binder, thereby avoiding the need to maintain a mixture of a ceramic powder and a binder. Moreover, the liquid-state pre-ceramic polymer component may be an aqueous paste, thereby avoiding the need for an organic binder that may be harmful to the environment. Also, the methods provided herein, in another embodiment, permit a non-porous and/or crack-free ceramic article to be formed by additive manufacturing. Moreover, the methods provided herein, in still further embodiments, permit the inclusion of one or more additives that can enhance one or more characteristics of the ceramic articles. For example, one or more additives can impact the ceramic articles' mechanical properties, thermal properties, electrical properties, or a combination thereof. A liquid-state pre-ceramic polymer component is "substantially free" of a particular material when the material is present in the liquid-state pre-ceramic polymer component at an amount of 0 to about 0.5%, by weight, of the liquid-state pre-ceramic polymer component.

Liquid-State Pre-Ceramic Polymer Component

The methods provided herein may include providing a liquid-state pre-ceramic polymer component. The liquid-state pre-ceramic polymer component generally may include one or more polymers, such as polysilazane, that are (i) in a liquid state at the temperature at which the methods are performed, and (ii) may be converted to a ceramic according to the methods provided herein. The liquid-state pre-ceramic polymer component also may include one or more additives, one or more UV sensitizers, or a combination thereof. In embodiments, the liquid-state pre-ceramic polymer component is a paste. In particular embodiments, the liquid-state pre-ceramic polymer component is an aqueous paste. The aqueous paste may include water and one or more pre-ceramic polymers, and, optionally, at least one of a UV sensitizer and one or more additives.

In one embodiment, the liquid-state pre-ceramic polymer component includes polysilazane.

One or more additives may be included in the liquid-state pre-ceramic polymer component to achieve one or more desired characteristics, such as a desired mechanical or other functional property. The one or more additives may include a plurality of nanoparticles, a plurality of nanotubes, a powder, a UV sensitizer, or a combination thereof. Other additives are envisioned, including fillers, viscosity modifying agents, pigments, dyes, etc.

Carbon nanotubes may be present in the liquid-state pre-ceramic polymer component in any amount sufficient to impart one or more desirable properties to the liquid-state pre-ceramic polymer component. In embodiments, the carbon nanotubes are present at an amount of about 0.01% to about 50%, about 0.01% to about 45%, about 0.01% to about 40%, about 0.01% to about 35%, about 0.01% to about 30%, about 0.01% to about 25%, about 0.01% to about 20%, or about 0.01% to about 16%, by volume fraction, of the liquid-state pre-ceramic polymer component. The plurality of nanotubes may include carbon nanotubes selected from single-walled carbon nanotubes (SWNTs), multi-walled carbon nanotubes (MWNTs), or a combination thereof.

A UV sensitizer may also be added to the liquid-state pre-ceramic polymer component. The UV sensitizer generally may be any agent that speeds, enhances, or otherwise desirably impacts the curing steps provided herein. A UV sensitizer may be present at an amount of about 1% to about 7%, about 1% to about 6%, about 1% to about 5%, or about 2% to about 4%, by volume fraction, of the liquid-state pre-ceramic polymer component. In one embodiment, the UV sensitizer includes dicumyl peroxide (DP). In another embodiment, the UV sensitizer includes dicumyl peroxide, and the dicumyl peroxide is present at an amount of about 1% to about 7%, about 1% to about 6%, about 1% to about 5%, or about 2% to about 4%, by volume fraction, of the liquid-state pre-ceramic polymer component.

The one or more additives also may include a powder. The powder may be a metal powder. The metal powder may include copper, nickel, silver, aluminum, iron oxide, titanium, chromium, or a combination thereof.

In one embodiment, the liquid-state pre-ceramic polymer component is formed by mixing [1] a pre-ceramic polymer and water, [2] a pre-ceramic polymer, one or more additives, and water, [3] a pre-ceramic polymer, a UV sensitizer, and water, or [4] a pre-ceramic polymer, one or more additives, a UV sensitizer, and water. The components may be mixed by any technique in the art, and may be mixed in a manner effective to eliminate or minimize the amount of gas entrapped in the resulting liquid-state pre-ceramic polymer component. The liquid-state pre-ceramic polymer component may be formed by mixing the components in a container, such as a beaker, with mechanical stirring, such as with a magnetic stir bar, for a period of time effective to substantially uniformly mix the components and/or ensure that the amount of gas entrapped in the resulting material is minimized.

The viscosity of the liquid-state pre-ceramic polymer component may be tested during or after the mixing of the ingredients of the liquid-state pre-ceramic polymer component. Based on the viscosity, (i) mixing may be continued as necessary, (ii) the type of one or more ingredients may be changed, (iii) the amount of one or more ingredients may be adjusted, or (iv) a combination thereof to achieve a desired viscosity. Not wishing to be bound by any particular theory, it is believed that when the liquid-state pre-ceramic polymer component is a paste, a relatively thick paste may make the disposing steps of the methods herein more difficult to perform and/or lead to cracks in the resulting ceramic articles, while a paste that is not viscous enough may make the disposing steps of the methods herein hard to control and/or extend processing time. Therefore, viscosity checks, if necessary, may be performed as the mixing of the ingredients proceeds. Mixing of the ingredients may be stopped when a desirable viscosity is achieved. Not wishing to be bound by any particular theory, it is believed that adjusting the ingredients and/or concentrations of the ingredients of the liquid-state pre-ceramic polymer components provided herein may permit a desirable correlation to be achieved between extrusion velocity and the motion of a 3D gantry system, when a 3D gantry system is used.

After a liquid-state pre-ceramic polymer component is obtained, the liquid-state pre-ceramic polymer component may be loaded into an extruder head, such as a syringe pump, or other device that is capable of disposing the liquid-state pre-ceramic material on a support.

Disposing

The disposing steps of the methods provided herein may be achieved by any technique known in the art. The disposing steps may be performed manually, i.e., by hand with an instrument such as a syringe or spatula, or automatically with the aid of one or more machines, such as a gantry system. The liquid-state pre-ceramic polymer component may be disposed, at least initially, on a support. The liquid-state pre-ceramic polymer component may be disposed on all or a portion of the support. Thereafter, one or more additional portions of the liquid-state pre-ceramic polymer component may be disposed on the support, a previously disposed portion of the liquid-state pre-ceramic polymer component, a solid-state pre-ceramic polymer component, or a combination thereof. A substrate may be placed on the support prior to the disposing steps of the methods provided herein. The substrate may cover all or a portion of the support, the liquid-state pre-ceramic polymer component may cover all or a portion of the substrate. A substrate may be removed from the support and/or a ceramic article before or after the curing and/or pyrolysis. For example, the substrate may be used to shuttle a sample to and/or from a support, a curing apparatus, a pyrolyzing apparatus, or a combination thereof.

In embodiments, the disposing of the liquid-state pre-ceramic polymer component comprises extruding the liquid-state pre-ceramic polymer component. In one embodiment, disposing the liquid-state pre-ceramic polymer component on a support comprises 3D printing the liquid-state pre-ceramic polymer component on the support. The liquid-state pre-ceramic polymer component may be extruded using a paste extrusion mechanism called a Ram Extrusion Mechanism. In a Ram Extrusion Mechanism, the extruder may be mounted on a computer controlled 3D gantry system. This process may be carried out using a syringe pump, such as the syringe pump provided herein. In embodiments, the liquid-state pre-ceramic polymer component has a viscosity sufficient to permit the disposing steps provided herein.

The liquid-state pre-ceramic polymer components generally may be disposed on any support and/or substrate that is capable of enduring one or more of the steps of the methods provided herein, such as the disposing, curing, pyrolysis, or a combination thereof. In one embodiment, the support is maintained at a temperature that is (i) equal to, (ii) less than, or (iii) about 0.01% to about 5% greater than the freezing point of the liquid-state pre-ceramic polymer component. In a particular embodiment, the support is maintained at a temperature equal to or less than the freezing point of the liquid-state pre-ceramic polymer component. Not wishing to be bound by any particular theory, it is believed that a support maintained at a temperature at, near, or below the freezing point of the liquid-state pre-ceramic polymer component may allow the dimensions of the liquid-state pre-ceramic polymer component disposed on the substrate to be maintained.

Curing

The curing steps of the methods provided herein generally may be achieved by any technique known in the art. For example, light, heat, or a combination thereof may be used to achieve curing. As used herein, the term "curing" refers to a process that results in the formation of one or more covalent bonds between and/or among at least one polymeric ingredient of the liquid-state pre-ceramic polymer component.

In embodiments, curing of the liquid-state pre-ceramic polymer component is achieved with ultraviolet (UV) light. The UV light may include one or more wavelengths. The one or more wavelengths may include a wavelength of about 345 nm to about 385 nm, about 355 nm to about 375 nm, or about 365 nm. A commercially-available UV lamp may be used to cure the liquid-state pre-ceramic polymer components. The UV light may be applied continuously or intermittently.

In embodiments, curing of the liquid-state pre-ceramic polymer component is achieved by heating the liquid-state pre-ceramic polymer component. In one embodiment, the curing of the liquid-state pre-ceramic polymer component includes heating the liquid-state pre-ceramic polymer component to a temperature of about 100° C. to about 200° C. for about 30 minutes to about 1 hour. Other temperatures and times may be used.

The liquid-state pre-ceramic polymer component, or a portion thereof, may be exposed to light, heat, or a combination thereof for a time effective to cure the liquid-state pre-ceramic polymer component to a desired degree. Achieving the "desired degree" of curing may result in a pre-ceramic polymer component that is (i) a solid or (ii) more viscous than the liquid-state pre-ceramic polymer component prior to curing. Therefore, the phrase "solid-state pre-ceramic polymer component" that is used herein to describe the pre-ceramic polymer component after curing should not be construed as implying that the curing step necessarily results in a material that is a solid; instead, the phrase "solid-state pre-ceramic polymer component" refers to cured pre-ceramic polymer components that are (i) in the solid state or (ii) more viscous than the liquid-state pre-ceramic polymer components prior to curing. The curing time may vary based on the thickness of the one or more portions of a liquid-state pre-ceramic polymer component disposed on a support, the composition and characteristics of the liquid-state pre-ceramic polymer component, or a combination thereof.

The curing may be performed after one or more portions of a liquid-state pre-ceramic polymer component has been disposed on (i) a support, (ii) another portion of a liquid-state pre-ceramic polymer component, (iii) a solid-state pre-ceramic polymer component, or (iv) a combination thereof. In one embodiment, a first portion of a liquid-state pre-ceramic polymer component is disposed on a support; the first portion is cured to form a solid-state pre-ceramic polymer component; a second portion of the liquid-state pre-ceramic polymer component is disposed at least partially on the solid-state pre-ceramic polymer component; and the second portion of the liquid-state pre-ceramic polymer component is cured. In another embodiment, a first portion of a liquid-state pre-ceramic polymer component is disposed on a support; a second portion of the liquid-state pre-ceramic polymer component is disposed on the first portion of the liquid-state pre-ceramic polymer component; and the first portion and the second portion are cured.

Pyrolysis

Generally, the pyrolysis steps of the methods provided herein include a process that converts the solid-state pre-ceramic polymer component to a ceramic material. Not wishing to be bound by any particular theory, it is believed that the pyrolysis of the cured pre-ceramic polymer components may result in thermochemical decomposition of the organic materials, which may result in the formation of ceramic materials. The pyrolysis steps may be performed at a temperature and time effective to achieve the thermochemical decomposition of the organic materials, and in the absence of oxygen. The pyrolysis steps of the methods provided herein may be performed at a temperature and a time effective to achieve a desired degree of density of the ceramic articles. In one embodiment, the pyrolysis steps may be performed in a furnace capable of achieving a density at or near full density. Not wishing to be bound by any particular theory, it is believed that some embodiments of the cured materials provided herein may be pyrolyzed into ceramic materials that are at least substantially non-porous. An article is "substantially non-porous" when it includes pores in an amount of 0 to about 3%, by volume.

The pyrolysis may include subjecting a cured pre-ceramic polymer component to a temperature of about 750° C. to about 1,500° C., about 750° C. to about 1,250° C., or about 1,000° C.

During the pyrolysis steps of the methods provided herein, the ceramic articles may experience weight loss, linear shrinkage, or a combination thereof. Therefore, the shrinkage rate and/or weight loss rate may be determined in order to control the dimensions and/or weight, respectively, of the final ceramic products produced by the methods provided herein.

Apparatuses and Systems

Apparatuses for manufacturing a ceramic article are provided that may include a syringe pump. The syringe pump may include a reservoir configured to house a liquid-state pre-ceramic polymer component, a stepper motor, one or more gears, and a push rod. The stepper motor may be coupled to the one or more gears, and the one or more gears may be configured to apply a force to the push rod to evacuate the liquid-state pre-ceramic polymer component housed in the reservoir. The push rod, upon application of the force, may at least partially enter or be advanced in the reservoir to evacuate the liquid-state pre-ceramic polymer component. The syringe pump also may include a needle through which the liquid-state pre-ceramic polymer component is evacuated. The stepper motor and/or the gear ratio (when the one or more gears includes a gear set) may be adjusted to apply a desired force to the push rod. The desired force may depend on the viscosity of the liquid-state pre-ceramic polymer component.

Figure 1A:
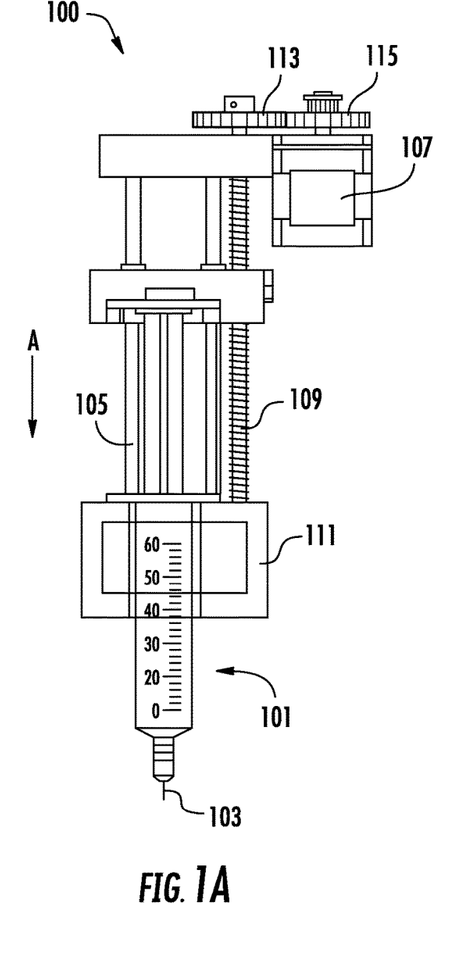
FIG. 1A depicts a front view of one embodiment of a syringe pump.
Figure 1B:
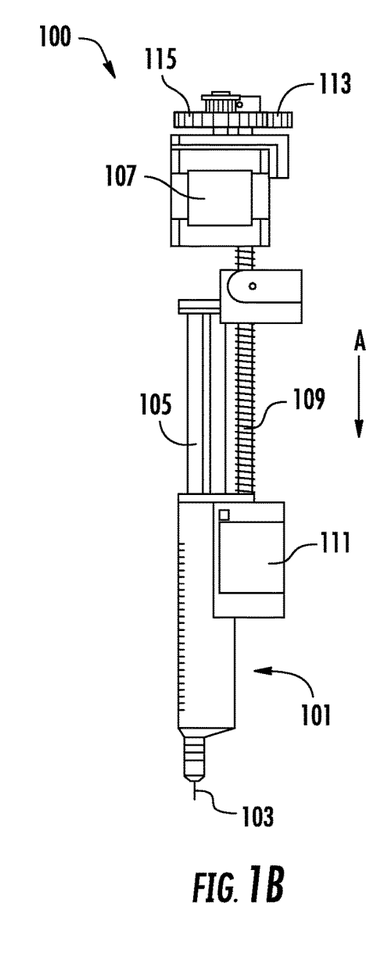
FIG. 1B is a side view of the syringe pump of FIG. 1A.

An embodiment of a syringe pump is depicted at FIG. 1A and FIG. 1B. FIG. 1A depicts a syringe pump 100, and FIG. 1B is a side view of the syringe pump 100 of FIG. 1A. The syringe pump 100 includes a reservoir 101, a needle 103, and a push rod 105 with a plunger attached at its lower end (not shown). The reservoir 101 is mounted in a plastic housing 111. Although the reservoir 101 shown at FIG. 1A has a capacity of 60 mL, other sizes are envisioned. The size and/or gauge of the needle 103 may be selected based on the viscosity, desired flow rate, line dimensions, or a combination thereof.

The syringe pump 100 also includes a stepper motor 107 and a gear set (113, 115). In one embodiment, the motor has a maximum axial force of 10N, and the gear set (113, 115) has a ratio of 1:5, so that the maximum force exerted is 50N. The gear set (113, 115) has a 10 tooth pinon gear 115 attached to the shaft of the stepper motor 107, and a 50-tooth gear 113 attached to the threaded rod 109. Thus, by turning the threaded rod 109, the system moves the push rod 105 and the plunger attached thereto in direction A. The gears may be made of any suitable material, including 3D-printed ABS polymers, which can be considered self-lubricating. In other embodiments, metal gears, such as aluminum gears, may be used.

Also provided herein are systems for additive manufacturing of a ceramic article. In embodiments, the systems comprise a 3D printer that includes a gantry system and a computer controller; and a syringe pump, as provided herein, that is mounted to the gantry system. In one embodiment, a liquid-state pre-ceramic polymer component, such as those provided herein, is disposed in the reservoir of the syringe pump. The phrase "gantry system", as used herein, refers to a system capable of directing a device, such as an extruder head (e.g., a syringe pump), and/or a support to a location provided by an XYZ coordinate.

Figure 2:
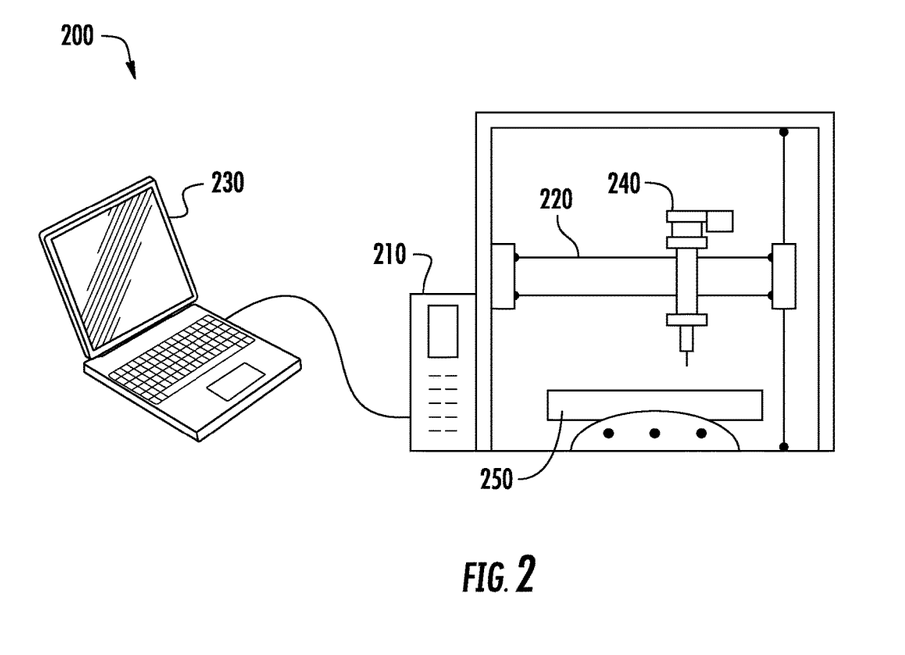
FIG. 2 depicts one embodiment of a system for additive manufacturing of a ceramic material.

An embodiment of a system 200 for additive manufacturing is depicted at FIG. 2. The system 200 includes a 3D printer 210 that includes a gantry system 220 and a computer controller 230. A syringe pump 240 is mounted to the gantry system 220, which may move the syringe pump 240 and/or the support 250 as the contents of the reservoir of the syringe pump 240 is disposed on the support 250.

The systems provided herein also may include one or more other components, including, but not limited to, a UV lamp, an apparatus for aligning carbon nanotubes, or a combination thereof. The apparatus for aligning carbon nanotubes may include a device that exerts a magnetic field, an electrical field, or a combination thereof.

In the descriptions provided herein, the terms "includes," "is," "containing," "having," and "comprises" are used in an open-ended fashion, and thus should be interpreted to mean "including, but not limited to." When methods and composite materials are claimed or described in terms of "comprising" various components or steps, the composite materials and methods can also "consist essentially of" or "consist of" the various components or steps, unless stated otherwise.

The terms "a," "an," and "the" are intended to include plural alternatives, e.g., at least one. For instance, the disclosure of "a liquid-state pre-ceramic polymer component," "a UV sensitizer," "a powder", and the like, is meant to encompass one, or mixtures or combinations of more than one liquid-state pre-ceramic polymer component, UV sensitizer, powder, and the like, unless otherwise specified.

Various numerical ranges may be disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. Moreover, all numerical end points of ranges disclosed herein are approximate. As a representative example, Applicant discloses, in one embodiment, that a UV sensitizer may be present in an amount of about 1% to about 7%, by volume fraction, of the liquid-state pre-ceramic material. This range should be interpreted as encompassing weight percentages in a range from about 1% to about 7%, and further encompasses "about" each of 2%, 3%, 4%, 5%, and 6%, including any ranges and sub-ranges between any of these values.

EXAMPLES

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims. Thus, other aspects of this invention will be apparent to those skilled in the art from consideration of the specification and practice of the invention disclosed herein.

Materials and Equipment

For the examples described below (Examples 1-3), a LulzBot® TAZ 4 3D printer was retrofitted for the printing of liquid-state pre-ceramics. Other printers can also be used and retrofitted in the manner described below, as long as they provide three dimensional motion capability. The most important selection criterion for the 3D printer was the availability of open source materials for both hardware and software.

The main part of the machine that was changed was the extruder head. The factory-fitted extruder head's primary mode of operation was pulling a plastic (i.e., polymer) and heating it up to a temperature at or near the plastic's melting temperature and depositing it upon a heated bed. Since the liquid-state pre-ceramic polymer components are not solids, another mode of operation was required for the following examples. The new extruder head used in the examples below operated by extruding paste-like materials and curing them. This required the use of new designs and repurposed commercially available devices, which were adapted into the printer assembly.

A LulzBot® TAZ 4 3D printer having a RepRap Arduino-compatible Mother Board ("RAMBo") microcontroller was used to drive the stepper motors of the syringe pumps in the following examples. The RAMBo is an open/libre hardware solution that allows the user to modify the firmware with the Arduino development environment. The 3D printer used in the Examples below was run using the Marlin firmware package, updated Q4 2014.

The 3D printer was modified with a custom extruder head to accommodate printing ceramics, and other substrates were placed on the print stage to avoid damaging the print stage of the device. A carbon nanotube alignment unit also was attached to the 3D printer, and a pulse flashing platform was added to cure the ceramic at each layer.

The extruder head which was used in the Examples below consisted of a housing, which was printed by the original unmodified LulzBot® TAZ 4 3D printer, along with a movable slider which could accommodate the push rod, and a stepper motor which controlled the gear set which moved the push rod. Each of these components is described in more detail at the following sections.

Syringe Pump System

Throughout the examples described below, a liquid-state pre-ceramic polymer component was placed into a syringe pump. The syringe pump used in the examples had the structure and features of the syringe pumps shown at FIG. 1A and FIG. 1B, except the size of the reservoir of the syringe pumps used in the examples was 20 mL, and the gear ratio was 7:1. The gears were made of 3D-printed ABS polymers and were considered self-lubricating. The design of the syringe pump utilized the housing and the motion controls to extrude the liquid-state pre-ceramic polymer component onto a support through an extrusion mechanism.

A syringe pump that had a relatively smaller cross sectional extrusion area was chosen to achieve greater precision and to ease the extrusion of the liquid-state pre-ceramic polymer component.

Controller System

There were two independent control systems used in the following examples: a Smart LCD controller, and the installed computer. TAZ 4 operated independently with the installed Smart LCD controller and display module. However, a personal computer was used to control the 3D printer, using software provided by LulzBot® in order to allow for finer control of the printer, and for preparing and organizing model files. Specifically, a Dell® OptiPlex 2500 with an Intel® Core 2 Duo processor, 2 GB of RAM, and 755 GB installed hard disk space was used to control the 3D printer. The 3D printer was connected to the printer via a USB 2.0 B-type connector, which is standard for Arduino based printer platforms. The PC had Windows 7 Home Premium installed as the operating system. Other supporting software was installed to aid the execution of the work. Some of the other installed Software are listed in the Table 1 below.

TABLE 1

| Other software enhancing 3D printing | |
|---|---|
| Application | Purpose |
| Repetier Host | Printer controller. Allows the user to place 3D objects on the print platform, adjust printer settings, and manually control the printer |
| Slic3r | Slicing program. Converts STL file information to G-Code to dictate printer path and steps |
| Amcap | Webcam software that allows for creation of time-lapse videos and remote monitoring |
| Netfabb Basic | 3D model viewer/editor. Repairs STL file meshes for use with the 3D printer. |

The control system provided a way of monitoring how the machine worked and also reported the status of the result produced. The user interface provided a platform for a successful interaction between the system and the user. TAZ 4 is compatible with Repitier host incorporated with slic3er. The host provided a simple method of loading the 3D models (CAD drawings) and also inputting the required specification of the article to be produced. The slic3er sliced the uploaded model into lines and layers, and automatically generated the g-code for the model. These lines and layers were the pathway that the 3D gantry followed in the course of 3D printing the articles.

Ultraviolet Lamp Array

The liquid-state pre-ceramic polymer components included a UV sensitizer. Dicumyl peroxide was used as the UV sensitizer in the examples herein. The 3D printer was also retrofitted with a UV lamp array which was used to for curing. The liquid-state pre-ceramic polymer components were cured to a solid state in the examples. A commercial UV lamp was used that included four 9 W UV fluorescent bulbs. The bulbs emitted UV A radiation centered on a wavelength of 365 nm.

Pre-Ceramic Polymers

A pre-ceramic polymer was purchased and served as the precursor in all of the examples listed below. The pre-ceramic polymer was KDT HTT 1800 or K-1034 and was purchased from Kion Defense Technologies, Inc (KDT).

This pre-ceramic polymer was polysilazane (>99%), which is a heat-curable coating resin. Polysilazane typically is a clear, low viscosity liquid. Solidification of polysilzane is known to occur at various temperatures with the addition of a free radical initiator, such as dicumyl peroxide, but may solidify on its own at temperatures of about 200° C. to about 250° C. The properties of the polysilaze used in the Examples are listed in Table 2 below.

TABLE 2

Physical Properties of Polymer Derived Ceramics

| Properties | KDT Result | Tested Result |
|---|---|---|
| Color | Clear to pale yellow liquid | Clear liquid |
| % Resin | 100% solids as a liquid | 100% solids as a liquid |
| Density of Liquid | 1.020 g/cm³ | 1.192 g/cm³ |
| Density of Cured Material | 1.120 g/cm³ | 1.124 g/cm³ |
| Density of Ceramic | 2.400 g/cm³ | 2.309 g/cm³ |
| Viscosity | 80 cps @ 19° C. [67° F.] | 76 cps @19° C. [67° F.] |

Carbon Nanotubes

The carbon nanotubes used in the examples below were multi-walled carbon nanotubes, purchased from Sigma Aldrich. These carbon nanotubes included more than 95% carbon, by weight, and were chemically prepared by chemical vapor deposition (CVD) using cobalt and molybdenum as catalysts (CoMoCat). The properties of the carbon nanotubes are listed at Table 3 below.

TABLE 3

Properties of Carbon Nanotube

| Properties | Result |
|---|---|
| Assay | >95% (Carbon) |
| Form | Powder |
| Outer Diameter x Length | 6-9 nm x 5 μm |
| Diameter | 5.5, mode 6.6, median |
| Melting Point | 3652-3697° C.(lit) |
| Density | ~2.1 g/mL @25° C.(lit) |
| Bulk Density | 0.22 g/cm³ |

Example 1: Shrinkage

Different mixtures of the carbon nanotubes and the pre-ceramic polymer described above were prepared, and the densities of these mixtures were measured in different states. Specifically, variation in the density of pre-ceramic polymers from the liquid state to the cured state, and finally to a ceramic materials was observed to contribute to the shrinkage rate, which was evaluated before 3D printing of the liquid-state pre-ceramic polymer components.

Various parts were extruded having different thicknesses, lengths, and breadths as a liquid-state pre-ceramic polymer component, and then the parts were converted to a ceramic, and the resulting thicknesses, lengths, and breadths of the ceramics were measured to determine the shrinkage rates of these materials. The shrinkage of these materials is shown at Table 4.

TABLE 4

Shrinkage allowance of 2% and 16% CNT in Polysilazane by weight

| Parameter | Initial Values (mm) | Final Values (mm) | Shrinkage | % Shrinkage |
|---|---|---|---|---|
| Thickness (2% CNT in Polysilazane by weight) | 03.08 | 03.00 | 00.08 | 02.26 |
| Length (2% CNT in Polysilazane by weight) | 16.17 | 16.08 | 00.09 | 00.56 |
| Breadth (2% CNT in Polysilazane by weight) | 13.30 | 13.21 | 00.09 | 00.68 |
| Thickness (16% CNT in Polysilazane by weight) | 02.24 | 02.18 | 00.06 | 02.68 |
| Length (16% CNT in Polysilazane by weight) | 15.24 | 15.18 | 00.06 | 00.39 |
| Breadth (16% CNT in Polysilazane by weight) | 13.74 | 13.67 | 00.07 | 00.51 |

While there was no apparent difference between components containing 2% carbon nanotubes, by weight, and those containing 16% carbon nanotubes, by weight, it was observed that the thinner parts shrank more than their thicker counterparts. Therefore, it is believed that shrinkage may be minimized in bulk experiments.

Example 2: Extrusion, Curing, and Pyrolysis of Liquid-state Pre-ceramic Polymer Component Paste samples containing 2 wt % carbon nanotubes were prepared as described at Example 1, and lowered to a temperature below the freezing point of the paste, and extruded through the 3D printer described above into various shapes. The shapes included a cube, a disc, a ring, and a square frame.

It was observed that extrusion typically occurred in three stages: (1) an initial stage, (2) a steady stage, and (3) a static stage.

In the initial stage, which lasted from the beginning of ram movement to the steady stage of paste extrusion, the paste flowed easily, but trapped gasses were seen in the syringe pump. The printed parts made during this stage were more likely to be porous than objects printed in later stages, likely due to the trapped gases.

In the steady stage, ram velocity was set above the critical value to extrude the paste, and the pressure was kept constant or nearly constant. The paste flowed easily, and produced high quality samples, which were less porous than those produced in the initial stage.

As the syringe emptied, the flow of paste eventually reached a static stage, where the paste could hardly flow, likely due to its lower liquid content. Because the paste could hardly flow at this stage, no samples were made after the syringe reached the static stage.

The samples extruded in this example were placed on aluminum foil coated with a releasing agent, and placed in an oven for 24 hours at a temperature of 140° C. to cure the samples. This step was taken to attempt to maintain the shape of the 3-D printed samples and to prepare the material for pyrolysis. Visual observation showed that shrinkage occurred on the surface of the materials, as well as cracks in the surface of the material.

The samples then were placed onto a ceramic plate and into a furnace, and the furnace temperature was gradually increased until it reached 1000° C. to pyrolyze the samples, transforming the samples from a solid polymer state to a ceramic material. The pyrolyzed samples experienced some cracking.

Example 3: Ceramic Morphology

After studying the bulk and thin materials produced at Example 2, thin layer structures were created to better evaluate the morphology of the resulting ceramic material and study its microstructure, shape, and surface texture.

A mixture of 2 wt % CNTs in polysilazane was prepared and extruded through the retrofitted 3D printer described above into the shape of a flat coil.

A visual inspection of the extrudate reavealed that it was acceptable, but some inconsistency in the structure occurred at the start of printing (the initial stage as discussed in Example 2). This inconsistency resulted in a different thickness at or near the areas where printing started. It is believed that trapped ammonia gas also may have caused or contributed to the inconsistencies.

The samples of this example were then cured at 140° C. for 24 hours, until they appeared fully cured and had a definite shape. Once the materials were fully cured, the material was observed visually. Some shrinkage occurred at the surfaces of the samples. While not intending to be bound by any particular theory, it is thought that this shrinkage caused or at least contributed to the cracks and fractures observed after pyrolysis.

The cured samples were then placed on a ceramic sheet and into a furnace, and the temperature of the furnace was slowly increased to 1000° C. These pyrolyzed samples experienced some cracking. The samples were then evaluated under an optical microscope. The images from the microscope revealed bubbles within the material, and pores at the surface of the core of the material suggested that the material was not fully mixed prior to extrusion extruded, suggesting the importance of sufficiently mixing the components of the liquid-state pre-ceramic polymer component.

The cross-section and surface of one of the samples was viewed under a scanning electron microscope. The images confirmed that the mixture of the polysilazane and the carbon nanotubes was not fully dispersed. For example, there were carbon nanotubes scattered over the surface of the material, rather than being mixed with the polysilazane. While not intending to be bound by any particular theory, it is believed that the failure of these carbon nanotubes to mix with the polysilazane was the cause of the fracture of the ceramic material.

We claim:

1. A method of manufacturing a ceramic article, the method comprising:
    providing a liquid-state pre-ceramic polymer component, wherein the liquid-state pre-ceramic polymer component is an aqueous paste;
    disposing the liquid-state pre-ceramic polymer component on a support, wherein the support is maintained at a temperature that is (i) equal to or (ii) less than the freezing point of the liquid-state pre-ceramic polymer component;
    curing the liquid-state pre-ceramic polymer component to form a solid-state pre-ceramic polymer component; and
    subjecting the solid-state pre-ceramic polymer component to pyrolysis at a temperature and time effective to form the ceramic article.

2. The method of claim 1, wherein the disposing of the liquid-state pre-ceramic polymer component on the support comprises 3D printing the liquid-state pre-ceramic polymer component on the support.

3. The method of claim 1, wherein the curing of the liquid-state pre-ceramic polymer component comprises exposing the liquid-state pre-ceramic polymer component to one or more wavelengths of ultraviolet light.

4. The method of claim 1, wherein the liquid-state pre-ceramic polymer component comprises polysilazane.

5. The method of claim 1, wherein the liquid-state pre-ceramic polymer component comprises one or more additives.

6. The method of claim 5, wherein the one or more additives comprises a plurality of nanoparticles, a plurality of nanotubes, a powder, a UV sensitizer, or a combination thereof.

7. The method of claim 5, wherein the one or more additives comprises a UV sensitizer, and the UV sensitizer is present in the liquid-state pre-ceramic polymer component at an amount of about 2% to about 4%, by volume fraction, of the liquid-state pre-ceramic polymer component.

8. The method of claim 5, wherein the one or more additives comprises a plurality of nanotubes, and the plurality of nanotubes comprises a plurality of carbon nanotubes selected from SWNTs, MWNTs, or a combination thereof.

9. The method of claim 8, wherein the plurality of carbon nanotubes are present in the liquid-state pre-ceramic polymer component at an amount of about 0.01% to about 16%, by volume fraction, of the liquid-state pre-ceramic polymer component.

10. The method of claim 5, wherein the one or more additives comprises a powder, and the powder comprises a metal powder.

11. A method of additive manufacturing a ceramic article, the method comprising:
    providing a liquid-state pre-ceramic polymer component, wherein the liquid-state pre-ceramic polymer component is an aqueous paste;
    disposing a first portion of the liquid-state pre-ceramic polymer component on a support that is at a temperature (i) equal to, (ii) less than, or (iii) about 0.1% to about 5% greater than the freezing point of the liquid-state pre-ceramic polymer component;
    exposing the first portion of the liquid-state pre-ceramic polymer component to ultraviolet light effective to substantially cure the first portion of the liquid-state pre-ceramic polymer component to form a first solid-state pre-ceramic polymer component;
    disposing a second portion of the liquid-state pre-ceramic polymer component at least partially on the first solid-state pre-ceramic polymer component;
    exposing the second portion of the liquid-state pre-ceramic polymer component to ultraviolet light effective to substantially cure the second portion of the liquid-state pre-ceramic polymer component to form a second solid-state pre-ceramic polymer component; and
    subjecting the first and second solid-state pre-ceramic polymer components to pyrolysis at a temperature and time effective to form the ceramic article.

12. The method of claim 11, wherein the liquid-state pre-ceramic polymer component comprises polysilazane, a UV sensitizer, and a plurality of carbon nanotubes.

13. The method of claim 11, wherein the liquid-state pre-ceramic polymer component is substantially free of an organic binder.

14. A method of manufacturing a ceramic article, the method comprising:
- providing a liquid-state pre-ceramic polymer component, wherein the liquid-state pre-ceramic polymer component is an aqueous paste;
- disposing the liquid-state pre-ceramic polymer component on a support, wherein the support is maintained at a temperature that is (i) equal to, (ii) less than, or (iii) about 0.01% to about 5% greater than the freezing point of the liquid-state pre-ceramic polymer component;
- curing the liquid-state pre-ceramic polymer component to form a solid-state pre-ceramic polymer component; and
- subjecting the solid-state pre-ceramic polymer component to pyrolysis at a temperature and time effective to form the ceramic article.

15. The method of claim 14, wherein the disposing of the liquid-state pre-ceramic polymer component on the support comprises 3D printing the liquid-state pre-ceramic polymer component on the support.

16. The method of claim 14, wherein the curing of the liquid-state pre-ceramic polymer component comprises exposing the liquid-state pre-ceramic polymer component to one or more wavelengths of ultraviolet light.

17. The method of claim 14, wherein the liquid-state pre-ceramic polymer component comprises polysilazane.

18. The method of claim 14, wherein the liquid-state pre-ceramic polymer component comprises one or more additives selected from the group consisting of a plurality of nanoparticles, a plurality of nanotubes, a powder, and a UV sensitizer.

* * * * *

UNITED STATES PATENT AND TRADEMARK OFFICE
CERTIFICATE OF CORRECTION

| | |
|---|---|
| PATENT NO. | : 10,384,393 B2 |
| APPLICATION NO. | : 15/607456 |
| DATED | : August 20, 2019 |
| INVENTOR(S) | : Chengying Xu |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 223 days.

Signed and Sealed this
Tenth Day of January, 2023

Katherine Kelly Vidal
*Director of the United States Patent and Trademark Office*